United States Patent
Ba Geri et al.

(10) Patent No.: US 11,407,929 B2
(45) Date of Patent: Aug. 9, 2022

(54) BARITE-QUARTZ AND CALCITE-QUARTZ FILTER CAKE REMOVAL METHOD

(71) Applicant: KING FAHD UNIVERSITY OF PETROLEUM AND MINERALS, Dhahran (SA)

(72) Inventors: Badr Ba Geri, Dhahran (SA); Ibrahim Gomaa, Dhahran (SA); Mohamed Mahmoud, Dhahran (SA); Shirish Patil, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/521,038

(22) Filed: Jul. 24, 2019

(65) Prior Publication Data

US 2021/0024809 A1    Jan. 28, 2021

(51) Int. Cl.
*C09K 8/528* (2006.01)
*C09K 8/03* (2006.01)

(52) U.S. Cl.
CPC .............. *C09K 8/528* (2013.01); *C09K 8/032* (2013.01)

(58) Field of Classification Search
None
See application file for complete search history.

(56) References Cited

U.S. PATENT DOCUMENTS

| | | | |
|---|---|---|---|
| 7,712,536 B2 | 5/2010 | Pirolli et al. | |
| 7,855,168 B2 | 12/2010 | Fuller et al. | |
| 8,584,757 B2 | 11/2013 | Reyes | |
| 8,906,199 B2 | 12/2014 | Giles et al. | |
| 9,587,171 B2 | 3/2017 | De Wolf et al. | |
| 9,976,073 B2 | 5/2018 | Salla et al. | |
| 2008/0139412 A1* | 6/2008 | Fuller | C09K 8/72 507/219 |
| 2014/0290951 A1 | 10/2014 | Al-Taq et al. | |

(Continued)

OTHER PUBLICATIONS

Mohamed Ahmed Nasr Eldin Mahmoud, "Removing of Formation Damage and Enhancement of Formation Productivity Using Environmentally Friendly Chemicals", Texas A&M University Dissertation, Petroleum Engineering, May 2011, 233 pages.

(Continued)

*Primary Examiner* — Jeffrey D Washville
(74) *Attorney, Agent, or Firm* — Oblon, McClelland, Maier & Neustadt, L.L.P.

(57) ABSTRACT

A method is described for removing a barite-quartz and a calcite-quartz filter cake from a well bore. The method involves contacting the filter cake with a first composition comprising $NH_4F$, $NaBrO_3$, $NH_4Cl$, and $NaNO_2$. The $NH_4Cl$ and $NaNO_2$ react exothermically, and the heat produced drives the endothermic reaction of $NH_4F$ and $NaBrO_3$, which produces HF for dissolution of the quartz in the filter cake. Filter cake comprising barite may be further treated with a second composition comprising a converting agent and a chelating agent. Filter cake comprising calcite may be treated with a first composition having an excess of $NH_4Cl$ and $NaBrO_3$, which react to produce HCl for calcite dissolution.

20 Claims, 2 Drawing Sheets

(56) References Cited

U.S. PATENT DOCUMENTS

2020/0362679 A1* 11/2020 Al-Nakhli ............... C09K 8/74

OTHER PUBLICATIONS

Aniket Vishwanath Shende, Dissolution of Barite Scale Using Chelating Agents; Texas A&M University Thesis, Petroleum Engineering, May 2011, 68 Pages.

Assad Ahmed Abdallah Barri, "Identifying Optimum Conditions for Stale Wormholes Created by Chelating Agents" Petroleum Engineering Thesis, May 2015, 197 Pages.

* cited by examiner

BARITE-QUARTZ AND CALCITE-QUARTZ FILTER CAKE REMOVAL METHOD

BACKGROUND OF THE INVENTION

Technical Field

The present invention relates to a method of removing filter cakes comprising quartz and barite or calcite.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The use of drilling fluids in drilling operations is as old as the age of rotary drilling. According to the American Petroleum Institute (API), drilling fluids are defined as a circulating fluid designed to be used during rotary drilling operations for one or more specific functions. See Fink, Johannes, 2015, *Petroleum Engineer's Guide to Oil Field Chemicals and Fluids*, Elsevier, DOI: 10.1016/C2015-0-00518-4. The mechanical and geological functions of drilling fluids as mentioned by Abraham (1933) include carrying the cuttings away from the bit, cooling and lubricating the drilling tools and the side walls of the well, creating a quick impermeable filter cake to seal-off all the porous formations (except the reservoir portion) as rapidly, effectively, and permanently as possible, stabilizing and supporting the heaving formations (shales) and preventing them from flowing into the well, imposing a sufficiently high hydrostatic pressure for overbalance drilling, and hindering any fluids or solids from entering the formation which may prevent hydrocarbon flow towards the well. See Abraham, W. E. V. 1933, "The Functions of Mud Fluids Used in Rotary Drilling," Paper WPC-1903, *World Petroleum Congress*.

Along with the above mentioned functions, drilling fluids should possess other main characteristics, including: being non-damaging to the porous strata containing the hydrocarbons, being non-hazardous to the surroundings and the crew dealing with them, and not damaging the drilling equipment by corrosion or excessive wear. See Caenn, Ryen, and George V. Chillingar, 1996, "Drilling Fluids: State of the Art," *Journal of Petroleum Science and Engineering* 14 (3): 221-30, DOI: 10.1016/0920-4105(95)00051-8; and Fink, Johannes, 2015, *Petroleum Engineer's Guide to Oil Field Chemicals and Fluids*, Elsevier, DOI: 10.1016/C2015-0-00518-4.

One of the major additional functions of the drilling fluid is to form a stable impermeable filter cake along the interior sides of the drilled open sections of the well, especially for zones outside the production zone. A filter cake is the result of driving the liquid phase of the drilling fluid into the formation by pressure, leaving the solid particles on the well sides. An ideal filter cake should be completely impermeable in order to prevent fluid losses to the formation. In addition, it is recommended for the filter cake thickness to be less than or equal to 1/16 inch.

However, filter cake is considered one of the main introduced damages to the formation during drilling, especially for the pay zone section. After drilling, removing filter cake from the pay zone section to restore the well's original productivity is one of the main concerns for well completion and production engineers.

There are two main techniques for removing drilling mud filter cake. The first one relies on the mechanical action of a circulating solid-free formate brine at a high circulation rate. This mechanical action removes only about 10% of the deposited damage (filter cake). The other proposed methods use chemical reactions and include the use of live mineral and organic acids. See Huang, T., Ostensen, L., and Hill, A. D., "Carbonate Matrix Acidizing with Acetic Acid," Paper SPE 58715, presented at the SPE International Symposium on Formation Damage Control, Lafayette, La., 23-24 Feb. 2000. The use of enzymes, or the use chelating agents, are possible chemical methods for removing drilling filter cake. See Al Otaibi, M. B. and Nasr-El-Din, H. A., "Chemical Treatments for Removal of Drill-in-Fluid Damage in Horizontal-Multilateral Wells: Lab Studies and Case Histories," Paper SPE 94043 presented at the SPE Europec/EAGE Conference, Madrid, Spain, 13-16 Jun. 2005; Bradshaw, R., Hodge R., Wolf, N. O., Knox, D., Hudson, C. and Evans, E. "Formate-Based Reservoir Drilling Fluid Resolves High-Temperature Challenges in the Natuna Sea," Paper SPE 98347 presented at the International Symposium and Exhibition on Formation Damage Control, Lafayette, La., 15-17 Feb. 2006; and Bageri, B., Mahmoud, M. A., Shawabkeh, R. A., and Abduiraheem, A. 2017. "Barite Filter Cake Removing Composition and Method" US Pat Pub US20170145289.

However, in long horizontal sections of wells, especially those with sandstone, filter cake may form with a quartz content of up to 40%, and these filter cakes may not be susceptible to any of the abovementioned removal processes. The failure of these removal processes may occur when barite solids in the filter cake are covered by an accumulated quartz layer. In such cases, there is an urgent need for a reliable process to successfully degrade barite-quartz filter cake in sandstone formations with specific steps to dissolve the sand. In view of the foregoing, one objective of the present invention is to present an effective procedure for dissolving and removing barite-quartz filter cake in drilling and completion sectors.

BRIEF SUMMARY OF THE INVENTION

According to a first aspect, the present disclosure relates to a method for removing a barite-silicate filter cake from a surface in fluid communication with a wellbore and/or subterranean formation. The method involves contacting the barite-silicate filter cake with a first composition comprising $NH_4F$, $NaBrO_3$, $NH_4Cl$, and $NaNO_2$. Here, the $NH_4Cl$ and $NaNO_2$ react to produce $N_2$ gas and the $NH_4F$ and $NaBrO_3$ react to produce HF, the HF reacts to dissolve the silicate and produce a barite-rich filter cake, and contacting the barite-rich filter cake with a second composition comprising a chelating agent and a converting agent to dissolve the barite.

In one embodiment, the barite-silicate filter cake comprises 0.05-5 wt % silicate relative to a total weight of the barite-silicate filter cake.

In a further embodiment, the silicate comprises at least 80 wt % quartz relative to a total weight of the silicate.

In one embodiment, the first composition comprises 40-120 M $NH_4F$ per wt % Si present in the barite-silicate filter cake.

In one embodiment, the first composition comprises 10-80 M $NaBrO_3$ per wt % Si present in the barite-silicate filter cake.

In one embodiment, a total mass of barite-silicate filter cake dissolved is at least 80 wt % of a total mass of the barite-silicate filter cake.

In one embodiment, a maximum downhole pressure produced by the $NH_4Cl$ and $NaNO_2$ reacting exothermically to produce $N_2$ gas is 1.05-3 times a downhole pressure immediately prior to the contacting.

In one embodiment, the $NH_4Cl$ and $NaNO_2$ reacting exothermically increases a downhole temperature by 15-60° F. compared to a downhole pressure immediately prior to the contacting.

In one embodiment, the barite-silicate filter cake is contacted with the first composition for a time in a range of 6-48 h.

In one embodiment, the dissolving of the silicate and the dissolving of the barite occurs at a temperature in a range of 225-450° F. and a pressure in a range of 400-600 psi. In one embodiment, the chelating agent is a salt of at least one selected from the group consisting of DTPA, HEDTA, EDTA, GLDA, HEIDA, MGDA, EDDS, EGTA, NTA, CDTA, AMTP, HEDP, and citrate.

In a further embodiment, the chelating agent is a salt of DTPA, a salt of EDTA, or a salt of both.

In a further embodiment, the chelating agent consists of a salt of DTPA and a salt of EDTA, having a DTPA to EDTA mass ratio in a range of 1.0:1.1-1.1:1.0.

In one embodiment, the converting agent is at least one selected from the group consisting of ammonium carbonate, ammonium chloride, potassium carbonate, potassium chloride, potassium formate, potassium hydroxide, potassium nitrate, potassium cyanide, cesium carbonate, cesium chloride, cesium formate, lithium carbonate, lithium formate, calcium chloride, magnesium chloride, and sodium carbonate.

In a further embodiment, the converting agent is at least one selected from the group consisting of potassium carbonate, potassium chloride, potassium formate, potassium hydroxide, potassium nitrate, and potassium cyanide.

In one embodiment, the first and/or second composition comprises a polymer removal agent.

In one embodiment, the first and/or second composition further comprises at least one surfactant.

In one embodiment, the silicate filter cake further comprises calcium carbonate, and the first composition comprises an excess of both $NaBrO_3$ and $NH_4Cl$ so that the excess $NH_4Cl$ and $NaBrO_3$ react to produce HCl, and the HCl reacts to dissolve the calcium carbonate.

According to a second aspect, the present disclosure relates to a one-step method for removing a filter cake from a subterranean formation. The method involves contacting the filter cake with a first composition comprising $NH_4F$, $NaBrO_3$, $NH_4Cl$, and $NaNO_2$, where the filter cake comprises calcium carbonate and silicate. Here, the $NaNO_2$ and a first portion of $NH_4Cl$ react to produce $N_2$ gas, and the $NH_4F$ and a first portion of $NaBO_3$ react to produce HF, where the HF reacts to dissolve the silicate. A second portion of $NH_4Cl$ and a second portion of $NaBrO_3$ react to produce HCl, where the HCl reacts to dissolve the calcium carbonate.

In one embodiment, a molar ratio of $NH_4Cl$ to $NaNO_2$ is in range of 1.05:1-2.00:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
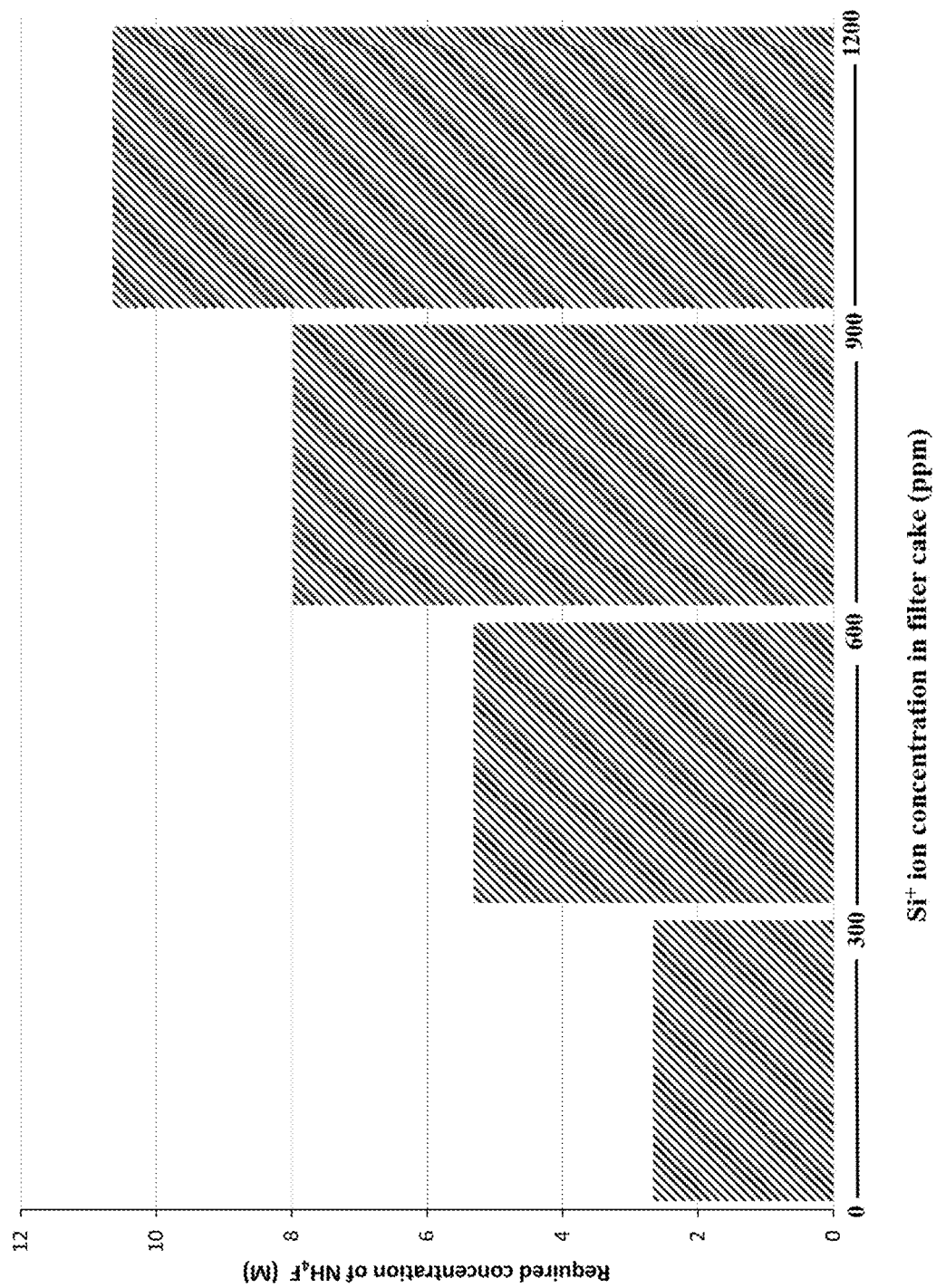
FIG. 1 illustrates the required concentration of $NH_4F$ in the first stage of filter cake removal as a function of Si concentration in the filter cake.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2.6H_2O$, and any other hydrated forms or mixtures. $CuCl_2$ includes both anhydrous $CuCl_2$ and $CuCl_2.2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, $^{30}Si$, $^{31}Si$, and $^{32}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method for removing a barite-silicate filter cake from a surface in fluid communication with a wellbore and/or subterranean formation.

Removing or dissolving a filter cake, as described here, means that the filter cake may break apart, dissolve, disperse, or disintegrate from a surface or from a portion of a filter cake. A method to dissolve a filter cake may be considered a "treatment," or a method of "treating" a filter cake. Preferably the surface is a wall of a wellbore, which may comprise shale, carbonate, sandstone, other minerals, rocks, or geological formations. In other embodiments, the surface may be concrete, a steel casing, a drill bit, an autoclave, a steel coupon, a ceramic filter, glass, or a glass frit. Preferably, the dissolving and removing of a filter cake as described by the method is a result of the components of the composition reacting with different compounds within the filter cake. However, the dissolving and removing may also result from the physical turbulence or flow of fluids against the filter cake, or by diffusion of a fluid into a filter cake or between a filter cake and the surface. In one embodiment, removing a filter cake from a surface may not totally remove or dissolve the filter cake. For instance, a filter cake in a wellbore may be treated with the composition as described while leaving a filter cake residue in the wellbore having a weight that is 0.5-20 wt %, preferably 1-15 wt % of the original total filter cake weight. Preferably this filter cake residue does not cause significant formation damage or significantly decrease hydrocarbon extraction yields. In one embodiment, a porous rock, such as Berea sandstone, has an initial permeability of 145-155 mD. After filter cake formation and then treatment with the composition to remove the filter cake, the permeability may be decreased to 137-144 mD, corresponding to a retained permeability of 88-99.3%, preferably 90-99.0%, more preferably 94-98.5%. Similarly, in one embodiment, a total mass of barite-silicate filter cake dissolved is at least 80 wt %, preferably at least 85 wt %, more preferably at least 90 wt %, even more preferably at least 95 wt % of a total mass of the barite-silicate filter cake.

The methods of the present disclosure are applicable in numerous different environments. The methods can be used to remove filter cake produced from drilling, production, completion, workover, or stimulation activity, either produced intentionally or unintentionally. They can be used in screen-only completions or gravel pack completions, an open hole or a cased hole, vertical or highly deviated wells. The first and/or second composition may be used as single-application soak or circulating fluid in which the composition also serves as a carrier fluid for, e.g., a gravel pack operation; in conjunction with a gelling agent or viscoelastic surfactant (e.g., ClearFRAC™) or alone, with a variety of clean-up tools and other fluid additives (e.g., anti-corrosive agents) or dissolution components. Since the problem of placement and uniform dissolution are present in virtually every instance, the composition and methods of the present disclosure are readily applicable to any scenario in which it is desirable to remove a filter cake from a wellbore or near-wellbore region in a formation, regardless of whether the filter cake is produced during drilling or during other post-drilling operations (e.g., fluid-loss control pill, gravel pack operation, fracturing, matrix acidizing, and others). In one embodiment, the composition may be used not necessarily to remove a filter cake, but to remove the drilling fluid particles from the pores of a formation.

In one embodiment, the barite-silicate filter cake is a water-based filter cake. Here, the barite-silicate filter cake may have a composition similar to a water-based drilling fluid, but with the weight percentage of liquids decreased from about 30-40 wt % relative to a total weight of the drilling fluid to about 10-20 wt % relative to a total weight of the filter cake. In an alternative embodiment, the filter cake may be an oil-based filter cake, and may be contacted with the same first and second compositions or with modified versions of the compositions.

In one embodiment, the barite-silicate filter cake comprises 0.05-5 wt %, preferably 0.06-3 wt %, more preferably 0.15-2 wt %, even more preferably 0.17-0.80 wt % silicate relative to a total weight of the barite-silicate filter cake. Silicates include but are not limited to, sandstone, quartz, feldspar, aluminosilicates, silica, tridymite, cristobalite, coesite, stishovite, lechatelierite, and amorphous silica. In one embodiment, the silicate comprises silica or quartz. For instance, the silicate may comprise at least 80 wt % quartz, preferably at least 85 wt % quartz, more preferably at least 90 wt % quartz, even more preferably at least 95 wt % quartz relative to a total weight of the silicate. In one embodiment, the barite-silicate filter cake may be considered a barite-quartz filter cake. In one embodiment, the silicate may originate from sandstone formations, and the barite-silicate filter cake may comprise other compounds and minerals from the sandstone formations.

In one embodiment, the barite-silicate filter cake comprises 30-90 wt %, preferably 35-85 wt %, more preferably 40-80 wt % barium sulfate (barite) with respect to a total weight of the filter cake prior to the contacting. The barium sulfate may be in the form of particles having diameters of 20-55 μm, preferably 25-50 μm, more preferably 30-45 μm. In an alternative embodiment, a barite-silicate filter cake may be formed from a drilling fluid containing a lower weight percentage of barite, for example, 10-30 wt %, preferably 12-20 wt % relative to a total weight percentage of the filter cake, and this lower weight percentage may result from the presence of other solids in the filter cake, such as bentonite clay, mica, walnut shells, particles of xanthum gum or modified cellulose, asphalts, gilsonites, sand, silicates, dolomite, calcite, hematite, and other weighting materials. A filter cake may comprise a corrosion inhibitor such as an amine, a hydrazine, including hexamine, phenylenediamine, and dimethylethanolamine; sulfite, ascorbic acid, benzotriazole, zinc dithiophosphates, zinc phosphate, tannic acid, zinc salts of organonitrogens, and benzalkonium chloride. The filter cake may have a thickness of 0.5-3.0 mm, preferably 0.7-2.8 mm, more preferably 0.8-2.5 mm. In an alternative embodiment, the filter cake may have a thickness of less than 0.5 mm or greater than 3.0 mm.

The method involves contacting the barite-silicate filter cake with a first composition comprising $NH_4F$, $NaBrO_3$, $NH_4Cl$, and $NaNO_2$. The first composition may comprise $NH_4F$, $NaBrO_3$, $NH_4Cl$, and $NaNO_2$ each independently at a concentration in a range of 0.25-12 M 0.5-12 M, preferably 1-11 M, more preferably 2-10 M, even more preferably 3-8 M. Here, the $NH_4Cl$ and $NaNO_2$ react to produce $N_2$ gas and the $NH_4F$ and $NaBrO_3$ react to produce HF. The HF reacts to dissolve the silicate and produce a barite-rich filter cake. The method then involves contacting the barite-rich filter cake with a second composition comprising a chelating agent and a converting agent to dissolve the barite.

Here, the $NH_4Cl$ and $NaNO_2$ react exothermically (producing heat) and the $NH_4F$ and $NaBrO_3$ react endothermically (requiring heat). In one embodiment, the pairing of the exothermic $NH_4Cl$ and $NaNO_2$ reaction with the endothermic $NH_4F$ and $NaBrO_3$ reaction allows the heat from the exothermic reaction to drive the endothernic reaction. In one embodiment, the heat from the exothermic reaction drives the reaction of $NH_4F$ and $NaBrO_3$ to a further extent than if the endothermic reaction did not occur, and the $NH_4F$ and $NaBTO_3$ were reacted at typical wellbore temperatures. In a further embodiment, the endothermic reaction does not consume all of the heat produced by the exothermic reaction, and the excess heat causes an increase in temperature that may be helpful in removing or dissolving the barite-silicate filter cake. In one embodiment, a solution comprising $NH_4Cl$ and $NaNO_2$ may first be sent down a wellbore in order to react and raise the temperature in proximity of the filter cake, and then another solution comprising $NH_4F$ and $NaBrO_3$ may be sent down the wellbore to form the first composition in contact with the filter cake and react in the elevated temperature.

In one embodiment, to limit the speed of either or both reactions of the first composition, one or more reagents may be encapsulated within or adsorbed to a dissolvable binder material, for instance, a compound that at least partially hydrolyzes or dissolves in aqueous solution to release the reactant. For instance, such delayed release encapsulation or binder material may include but is not limited to, esters, formates, lactic acid derivatives, methyl lactate, ethyl lactate, propyl lactate, and butyl lactate. Other suitable delayed release components include: formate esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Examples of esters also include esters or polyesters of glycerol including, but not limited to, tripropionin (a triester of propionic acid and glycerol), trilactin, and esters of acetic acid and glycerol such as monoacetin, diacetin, and triacetin. In certain embodiments, the delayed release component may include aliphatic polyesters; poly(lactides); poly(glycolides); poly(caprolactones); poly(hydroxy ester ethers); poly(hydroxybutyrates); poly(anhydrides); aliphatic polycarbonates; poly(orthoesters); poly(amino acids); poly(ethylene oxides); and polyphosphazenes; or copolymers thereof. Derivatives and combinations of any of the aforementioned examples also may be suitable. For example, various combinations of the esters or polyesters of hydroxy acid and/or glycerol also may be employed to adjust the half-life of the hydrolysis and release reactions.

In one embodiment, the first composition comprises 40-120 M $NH_4F$, preferably 50-110 M $NH_4F$, more preferably 60-100 M $NH_4F$, even more preferably 70-90 M or about 88 M $NH_4F$ per wt % Si present in the barite-silicate filter cake. These concentration ratios are indicated in FIG. 1, where a 1 ppm concentration in the filter cake is taken to be equivalent to 0.0001 wt % relative to a total weight of the filter cake. In a related embodiment, the first composition may comprise 0.5-16 M, preferably 1.5-12 M, more preferably 2.0-8 M $NH_4F$ per mm average thickness of the filter cake.

Figure 2:
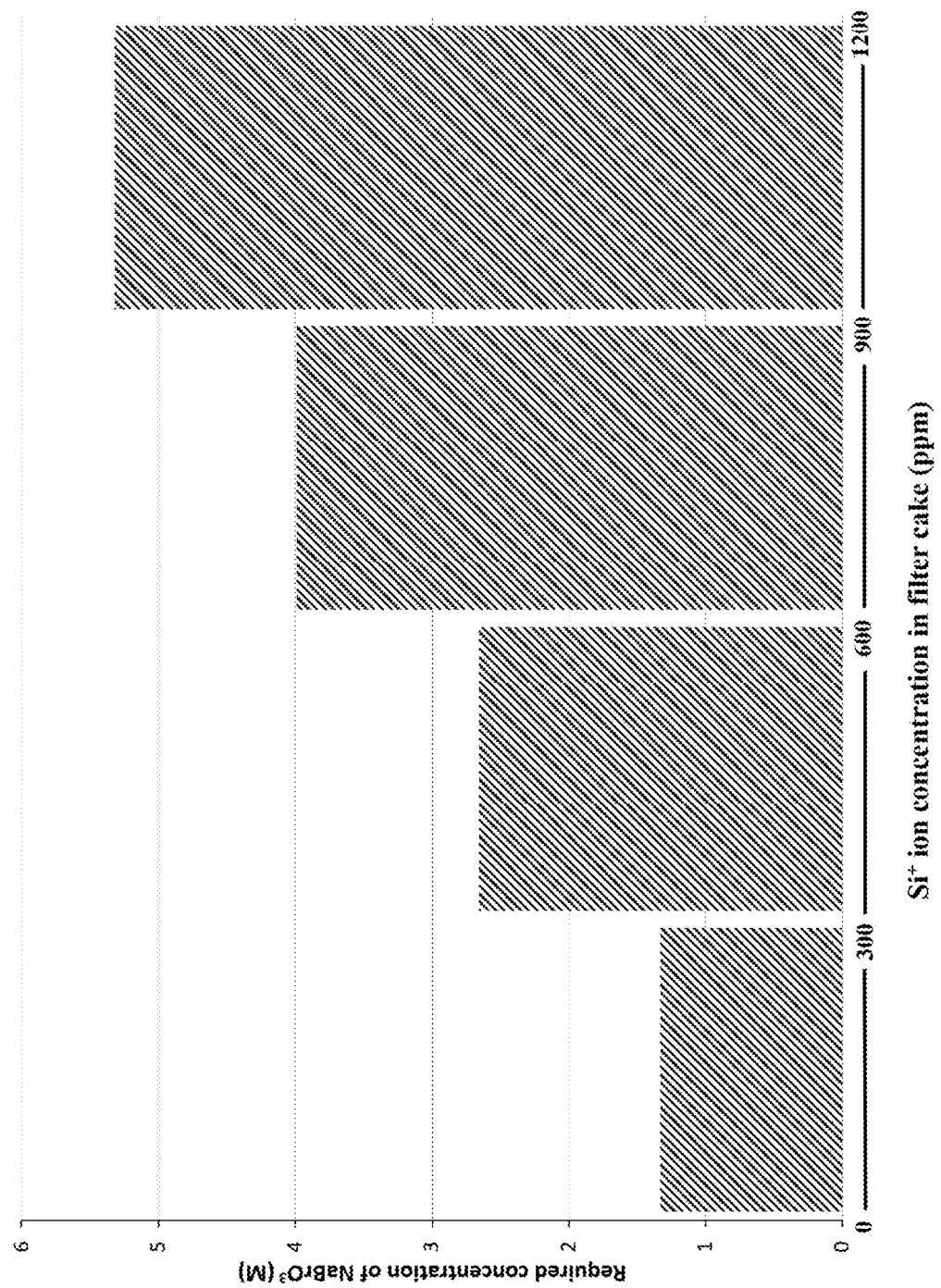
FIG. 2 illustrates the required concentration of $NaBrO_3$ in the first stage of filter cake removal as a function of Si concentration in the filter cake.

In one embodiment, the first composition comprises 10-80 M $NaBrO_3$, preferably 20-70 M $NaBrO_3$, more preferably 30-60 M $NaBrO_3$, or about 44 M $NaBrO_3$ per ppm Si present in the barite-silicate filter cake. These concentration ratios are indicated in FIG. 2. In a related embodiment, the first composition may comprise 0.2-10 M, preferably 0.8-6 M, more preferably 1-4 M $NaBrO_3$ per mm average thickness of the filter cake.

In one embodiment, the first and second compositions further comprise an aqueous liquid as a carrier fluid, which may be water, brine, seawater, or freshwater, and may be present at a weight percent of 24-95 wt %, preferably 30-90 wt %, more preferably 32-87 wt % relative to a total weight of the composition. An aqueous liquid may be taken from a natural source, such as an aquifer, lake, or ocean, and may be filtered to remove large solids before being mixed to form the composition. A brine is an aqueous mixture of one or more soluble salts, such as sodium chloride, potassium chloride, calcium chloride, calcium bromide, sodium bromide, potassium bromide, or zinc bromide, and has at least 30 g soluble salts per L solution. Sea water or water from a salt lake may be considered a brine, or a brine may be formed by mixing water or freshwater with soluble salts or a solution comprising soluble salts.

In one embodiment, the second composition comprises a chelating agent and a converting agent. The chelating agent may be present at a weight percentage of 10-35 wt %, preferably 12-30 wt %, more preferably 15-25 wt % relative to a total weight of the second composition. The converting agent may be present at a weight percentage of 1-14 wt %, preferably 2-10 wt %, more preferably 4-8 wt % relative to a total weight of the second composition.

In one embodiment, the chelating agent is a salt of at least one selected from the group consisting of DTPA (diethylenetriaminepentaacetic acid), HEDTA (N-(hydroxyethyl)-ethylenediaminetetraacetic acid), EDTA (ethylenediaminetetraacetic acid), GLDA (glutamic acid-N, N diacetic acid), HEIDA (hydroxyethyliminodiacetic acid), MGDA (methylglycinetetraacetic acid), EDDS (ethylenediamine-N, N-disuccinic acid, EGTA (ethylene glycol-bis($\beta$-aminoethyl ether)-N,N,N'N'-tetraacetic acid), NTA (nitrilotriacetic acid), CDTA (cyclohexanediaminetetraacetic acid), AMTP (aminotri(methylene phosphonic acid), HEDP (1-hydroxyethylidene-1, 1-diphosphonic acid), and citrate. The chelating agent may be considered a conjugate base of DTPA, HEDTA, EDTA, GLDA, HEDA, MGDA, EDDS, EGTA, NTA, CDTA, AMTP, HEDP, or citric acid. The chelating agent may be present in the composition at a wt % as described previously, or at a molar concentration of 0.45-0.75 M, preferably 0.50-0.70 M, or about 0.6 M. The cation of the salt may be sodium, potassium, lithium, or ammonium, or mixtures thereof. In an alternative embodiment, other chelating agents may be used, such as a salt of polyaspartic acid, a salt of BAPTA (1,2-bis(o-aminophenoxy)ethane-N,N,N',N'-tetraacetic acid), or a salt of some other aminopolycarboxylic acid.

In a preferred embodiment, the chelating agent is $Na_4$-EDTA, $K_4$-EDTA, $Na_5$-DTPA, $K_5$-DTPA, $Na_3$-HEDTA, and/or $K_3$-HEDTA. Even more preferably, the chelating agent is $K_4$-EDTA or $K_5$-DTPA. In an alternative embodiment, the conjugate acid of the salt may be used, such as citric acid or EDTA, and then converted into a conjugate base by the addition of a base such as KOH. In a further embodiment, the chelating agent is a salt of DTPA, a salt of EDTA, or a salt of both. In a further embodiment, the chelating agent consists of a salt of DTPA and a salt of EDTA, having a DTPA to EDTA mass ratio in a range of 1.0:1.1-1.1:1.0, preferably 1.0:1.05-1.05:1.0, or about 1:1.

In one embodiment, the converting agent is ammonium carbonate, ammonium chloride, potassium carbonate, potassium chloride, potassium formate, potassium hydroxide, potassium nitrate, potassium cyanide, cesium carbonate, cesium chloride, cesium formate, lithium carbonate, lithium formate, calcium chloride, magnesium chloride, or sodium carbonate. Preferably the converting agent is potassium carbonate, potassium chloride, potassium formate, potassium hydroxide, cesium chloride, cesium carbonate, cesium formate, lithium carbonate, or lithium formate; even more preferably the converting agent is potassium carbonate, potassium formate, cesium chloride, cesium carbonate, or cesium formate. In one preferred embodiment, the converting agent is potassium carbonate. In an alternative embodiment, the converting agent is a potassium salt, a cesium salt, or a lithium salt not listed above. In another preferred embodiment, the converting agent is at least one selected from the group consisting of potassium carbonate, potassium chloride, potassium formate, potassium hydroxide, potassium nitrate, and potassium cyanide.

Barite has a low solubility in water of about 2.5-2.9 mg/L at 20-30° C. As defined here, "barite" refers to the compound $BaSO_4$ (barium sulfate), and may also be spelled as baryte. In one embodiment, the converting agent is able to convert barite into a barium product having a higher solubility by an ion exchange reaction in an aqueous solution.

Preferably the barium product has a solubility in water that is increased by a factor of at least 5, preferably by a factor of at least 10, more preferably by a factor of at least 14, even more preferably by a factor of at least 1,000 compared to the solubility of barite in water at the same temperature. For example, cesium chloride may be used as the converting agent, whereby the following ion exchange reaction occurs between barium sulfate and cesium chloride in an aqueous solution: $BaSO_4 + 2CsCl \rightarrow BaCl_2 + Cs_2SO_4$. The salt $BaCl_2$ has a higher solubility of about 360 g/L in water at 19-21° C., which may be sufficient to completely dissolve the $BaSO_4$. In other embodiments, a converting agent may be used to produce a barium compound having a lower solubility than $BaCl_2$. For example, a carbonate salt (such as sodium carbonate) may be used to produce barium carbonate. Barium carbonate ($BaCO_3$) has a solubility of about 24 mg/L in water at 19-21° C. While this solubility is much lower than $BaCl_2$, a chelating agent may chelate the soluble $Ba^{2+}$, leading to further dissolution of the $BaCO_3$ and $BaSO_4$ solids.

In alternative embodiments, a converting agent may be used that is not one of the above listed compounds, but is a compound able to convert barite into a barium product having a similar increase in solubility as mentioned above. In other embodiments, the converting agent may be able to convert other compounds by an ion exchange reaction, and these compounds may be calcium carbonate, calcium sulfate, iron sulfide, or strontium sulfate. In a further embodiment, a chelating agent may similarly be used to increase dissolution.

In one embodiment, the first and/or second composition comprises a polymer removal agent. The polymer removal agent may be present at a concentration of 2-15 wt %, preferably 5-12 wt %, more preferably 6-10 wt %. The polymer removal agent may be a persulfate salt, a perborate salt, a peroxide salt, or an enzyme. A persulfate salt may be sodium persulfate, potassium persulfate, ammonium persulfate, or peroxydisulfate. A perborate salt may be sodium perborate or potassium perborate. A peroxide salt may be sodium peroxide, potassium peroxide, or lithium peroxide. In other embodiments, other oxidants may be used such as a percarbonate salt, a perphosphate salt, a persilicate salt, or a hypochlorite salt. In a preferred embodiment, the polymer removal agent is sodium persulfate. In on embodiment, where the polymer removal agent is an enzyme, the first or second composition comprising the enzyme may further comprise components to stabilize the enzyme, such as buffering agents, sodium borate, calcium formate, and/or propylene glycol.

In one embodiment, the polymer removal agent is an enzyme, and the enzyme is at least one selected from the group consisting of an amylase, an endoglucanase, a glucanase, a mannanase, a cellulase, and a xanthanase. The enzyme may be an oxidoreductase, a transferase, a hydrolase, a lyase, an esterase, an isomerase, or a ligase. Preferably the enzyme is temperature stable at wellbore temperatures and in the presence of the surfactant. Preferably the enzyme is not a metalloenzyme, or at least not a metalloenzyme that would be disabled by the chelating agent. Examples of temperature stable enzymes include, but are not limited to, α-amylase, α-glucosidase (for example, from *Pyrococcus furiosus* or *Thermococcus hydrothermalis*), pullulanase (for example, from *Thermococcus hydrothermals*), endocellulase A and B (for example, from *Thermotoga neapolitana*), α-galactosidase (for example, from *Thermotoga neapolitana*), xylanase (for example, from *Thermotoga maritima*), β-1,4-endoglucanase (for example, from *Pyrococcus horikoshii*), endo-β-glucanase (for example, from *Sulfolobus solfataricus*), Endoglucanase B (EGLB) (for example, from *Aspergillus niger*), celA cellulase from *Thermotoga maritima*, hemicellulase, mannanohydrolase, EBI-244 cellulase, a cellulase from *Desulfurococcus fermentans*, or a xanthanase from NRRL B-18445 culture. In one embodiment, the enzyme is a recombinant enzyme. In another embodiment, an enzyme may be genetically modified in order to provide stability and/or activity at high temperatures. In another embodiment, the enzyme may be a proprietary enzyme from a commercial formulation.

Preferably the polymer removal agent degrades a polymer present in the filter cake. The polymer may be introduced by the drilling fluid, and may be an oil soluble organic polymer, an oil dispersible organic polymer, an oil soluble bio-polymer, or an oil dispersible bio-polymer. The polymer may be polyacrylamide, partially hydrolyzed polyacrylamide, polyurethane, polybutylene and other polyalpha-olefins, polyvinyl chloride, xanthan, starch, pectin, gelatin, esters (such as esters of carboxylic acid, phosphonic acid, or sulfonic acid), guar gum, or locust bean gum.

In one embodiment, the first and/or second composition comprises a surfactant. A surfactant may be present at a weight percentage in a range of 0.02-10 wt %, preferably 0.1-5 wt %, more preferably 0.5-2 wt %. As defined here, a surfactant is a compound that lowers the surface tension (or interfacial tension) between two liquids, between a liquid and a gas, or between a liquid and a solid. The surfactant may be a nonionic surfactant, an anionic surfactant, a cationic surfactant, a gemini surfactant, a viscoelastic surfactant, or a zwitterionic surfactant. The surfactant may serve a role as a water-wetting agent, a defoamer, a foamer, a detergent, a dispersant, or an emulsifier. In other embodiments, the surfactant may act as a corrosion inhibitor or a lubricant.

A surfactant molecule comprises a hydrophilic head unit attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two hydrophilic heads and two hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl) dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycol alkyl ethers having the formula $CH_3—(CH_2)_{10-16}—(O—C_2H_4)_{1-25}—OH$, such as octaethylene glycol monododecyl ether and pentaethylene glycol monododecyl ether; polypropylene glycol alkyl ethers having the formula: $CH_3(CH_2)_{10-16}—(O—C_3H_6)_{1-25}—OH$; glucoside alkyl ethers having the formula $CH_3-(CH_2)_{10-16}—(O$-glucoside$)_{13}$-OH, such as decyl glucoside, lauryl glucoside, octyl glucoside; polyethylene glycol octylphenyl ethers having the formula $C_8H_{17}—(C_6H_4)—(O—C_2H_4)_{1-25}—OH$, such as Triton X-100; polyethylene glycol alkylphenyl ethers having the formula $C_9H_{19}—(C_6H_4)—O—C_2H_4)_{1-25}—OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

In one embodiment, the surfactant is N-cis-3-docosenoic-N,N-bis(2-hydroxymethyl)-N-methyl ammonium chloride, and/or a combination of an alkyl polyglycoside, an ethoxylated alcohol, and a triethyleneglycol monobutyl ether. In another embodiment, the surfactant in the composition comprises a surfactant chosen from the group consisting of ethylene oxide propylene oxide block copolymers; fatty amines; fatty polyamines; hydrophilically modified amines; ethoxylated derivatives of hydrophilically modified amines; ethoxylated derivatives of polyamines; propoxylated derivatives of hydrophilically modified amines; propoxylated derivatives of polyamines; ethoxylated tallow triamine; ethoxylated oleyl amine; soya ethylenediamine; tallow diethylene triamine; soya amines; ethoxylated soya amines; and derivatives or combinations thereof. In still another embodiment, the surfactant is a betaine surfactant, such as erucic amidopropyl dimethyl betaine or oleoylamidopropyl dimethyl betaine.

In an alternative embodiment, the surfactant may be a dendritic surfactant, and/or a dendritic extended surfactant. A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group in one non-limiting embodiment. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. The molecular weight of the dendritic surfactant may range from about 320 g/mol to about 7,572 g/mol, alternatively from about 455 g/mol to about 5,455 g/mol, or from about 530 g/mol to about 3,360 g/mol in another non-limiting example. Dendritic surfactant molecules are sometimes called "hyperbranched" molecules.

A dendritic extended surfactant is a dendritic surfactant having a non-ionic spacer arm between the hydrophilic group and a lipophilic tail. The non-ionic spacer-arm extension may be the result of polypropoxylation, polyethoxylation, or a combination of the two with the polypropylene oxide next to the tail and polyethylene oxide next to the head, in non-limiting embodiments.

In one non-limiting embodiment, the spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like.

In a particular embodiment, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups in one non-limiting embodiment. These portions are generally in blocks, rather than being randomly mixed. In one embodiment, the spacer arm extension may be a poly-propylene oxide chain.

In one embodiment, the surfactant is a water-wetting surfactant. As defined here, a water-wetting surfactant or water-wetting agent is a surfactant that when dissolved in a drop of water on a solid surface, decreases the contact angle between the drop and the surface. For instance, a drop of pure water on a certain substrate may have a contact angle of 80-100°, while a drop of a solution comprising 0.05-0.5 wt % water-wetting surfactant relative to a total weight of the drop may have a contact angle of 130-150° on the same type of surface. A water-wetting surfactant aids in replacing an air phase with an aqueous liquid phase at a surface. Likewise, a water-wetting surfactant may allow an aqueous liquid phase to replace oil or a non-polar phase in contact with a surface, such as the surface of a barite particle in a filter cake. In other words, a water-wetting surfactant may be used to water wet the filter cake.

In one embodiment, the surfactant may be a viscoelastic surfactant (VES). Conventional surfactant molecules are characterized by having one long hydrocarbon chain per surfactant head-group. In a viscoelastic gelled state these molecules aggregate into worm-like micelles. Viscoelastic gel breakdown occurs when the fluid contacts the oil in an oil-based filter cake, which causes the micelles to change structure or disband. A viscoelastic gel is a gel that has elastic properties, meaning that the gel at least partially returns to its original form when an applied stress is removed. Viscoelastic surfactants act as reversible thickening agents so that, in a filter cake removal composition, the viscosity changes significantly when in contact with an oil-based filter cake. In this way the composition is able to preferentially penetrate an oil-based filter cake. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In one embodiment, the first and/or second composition may further comprise a mutual solvent. A mutual solvent may be present at a weight percentage of 1-20 wt %, preferably 3-15 wt %, more preferably 4-12 wt %. As defined herein, a "mutual solvent" is a liquid that is substantially soluble in both aqueous and oleaginous fluids, and may also be soluble in other well treatment fluids. As defined here, "substantially soluble" means soluble by more than 10 grams mutual solvent per liter fluid, preferably more than 100 grams per liter. Mutual solvents are routinely used in a range of applications, controlling the wettability of contact surfaces before, during, and/or after a treatment, and preventing or breaking emulsions. Mutual solvents are used because insoluble particles from the formation adsorb organic films from the crude oil. These particles become partially oil-wet and partially water-wet. This causes them to collect material at any oil-water interface, which can stabilize various oil-water emulsions. Mutual solvents remove the organic films, leaving the particles water-wet, thus particle plugging in the formation is decreased. In some embodiments, a mutual solvent may be called a co-solvent.

The mutual solvent may be at least one selected from the group consisting of propylene glycol, ethylene glycol, diethylene glycol, glycerol, and 2-butoxyethanol. In a preferred embodiment, the mutual solvent is 2-butoxyethanol, which is also known as ethylene glycol butyl ether (EGBE) or ethylene glycol monobutyl ether (EGMBE). In alternative embodiments, the mutual solvent may be one of lower alcohols such as methanol, ethanol, 1-propanol, 2-propanol, n-butanol, n-hexanol, 2-ethylhexanol, and the like, other glycols such as dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more $C_2$-esters through C-esters, and substantially water/oil-soluble ketones, such as one or more $C_2$-$C_{10}$ ketones.

In one embodiment, the first and/or second composition may further comprise other components, such as alcohols, glycols, organic solvents, soaps, fragrances, dyes, dispersants, pH control additives or buffers, acids or bases, water softeners, bleaching agents, antifouling agents, antifoaming agents, anti-sludge agents, catalysts, corrosion inhibitors, corrosion inhibitor intensifiers, viscosifiers, diverting agents, oxygen scavengers, carrier fluids, fluid loss control additives, friction reducers, stabilizers, rheology modifiers, gelling agents, scale inhibitors, breakers, salts, crosslinkers, salt substitutes, relative permeability modifiers, sulfide scavengers, fibers, microparticles, nanoparticles, bridging agents, shale stabilizing agents (such as ammonium chloride, tetramethyl ammonium chloride, or cationic polymers), anti-foaming agents, clay treating additives, polyelectrolytes, non-emulsifiers, freezing point depressants, iron-reducing agents, biocides/bactericides and the like, provided that they do not interfere with the controlled dissolution of the filter cake as described herein. These components, when present, may be present in the composition at a weight percentage of 0.01-5 wt %, preferably 0.5-3 wt %, more preferably 0.8-2 wt %, relative to a total weight of the composition.

In one embodiment of the method, a ratio of a total volume of the first and/or second composition to the total weight of the filter cake prior to the contacting is 20-30 mug, preferably 22-28 mL/g, more preferably 23-27 mg. In other embodiments, however, the ratio may be much lower, such as 5-15 mL/g, or much higher, such as 40-55 mL/g or 60-70 mL/g. A high ratio may result from removing only small amounts of a filter cake in a wellbore, or from the first and/or second composition being continually flushed through a wellbore.

In one embodiment of the method, a temperature in the wellbore before the contacting is 225-400° F., preferably 240-385° F., more preferably 250-350° F. In some embodiments, the temperature may vary within a single wellbore, for instance, in one location of a vertical wellbore, the temperature may be 255-265° F., while 2,000 ft above may be 120-150° F., and 1,000 ft below may be 280-300° F. Across substantially horizontal segments of the wellbore, the temperature may not vary significantly.

In one embodiment, the $NH_4Cl$ and $NaNO_2$ react exothermically, and the heat produced increases a downhole temperature by 15-60° F., preferably 20-55° F., more preferably 22-50° F. compared to a downhole temperature immediately prior to the contacting. In one embodiment, the $NH_4Cl$ and $NaNO_2$ react exothermically, and the heat produced increases a downhole temperature by 100-350° F., preferably 150-300° F., more preferably 200-280° F., even more preferably 220-270° F. compared to a downhole temperature immediately prior to the contacting. In another embodiment, the increase in a downhole temperature may be in a range of 100-150° F., 150-200° F., 200-250° F., or 250-300° F. With the contacting the filter cake with the first and second compositions, the dissolving of the silicate and the dissolving of the barite may occur at a temperature in a range of 225-450° F., preferably 240-425° F., more preferably 250-410° F., even more preferably 250-350° F.

Additionally, the reaction of the $NH_4Cl$ and $NaNO_2$ produces $N_2$ gas, and the $N_2$ gas may increase the downhole pressure. In one embodiment, the maximum downhole pressure produced by the evolution of $N_2$ gas is 5-200%, preferably 8-100%, more preferably 10-30% greater than the initial downhole pressure, or the downhole pressure immediately before contacting the filter cake with the composition. The downhole pressure after the contacting may be in a range of 400-600 psi, preferably 420-580 psi, more preferably 450-550 psi, or about 500 psi.

Preferably the range in temperatures in the wellbore does not significantly decrease the effectiveness of the composition in removing a filter cake. In one embodiment, the temperature in the wellbore may be adjusted by heating or cooling the composition before transferring it to a wellbore.

In one embodiment, the barite-silicate filter cake is contacted with the first and/or second composition for a time in a range of 6-48 h, preferably 8-40 h, more preferably 12-36 h, even more preferably 18-30 h, or about 24 h.

In one embodiment, the composition may be formed by adding and mixing the components in any order, and then continuing to mix until a stable, uniform mixture is formed. In one embodiment, the composition may be formed by starting with a base solvent, such as water, brine, seawater, or freshwater, adding a component, mixing to uniformity, and then repeating for the remaining steps. Alternatively, two or more components may be added at a time and mixed, and in one embodiment, the composition may be heated while mixing, for example, to a temperature of 110-200° F., preferably 150-180° F., in order to more quickly dissolve certain components. The mixing may be performed by flowing through or across a static mixer, or with a turbine, blade, impeller, drum mixer, stir bar, paddle, or through some other form of agitation or blending. Alternatively, the components may be mixed continuously, such as "on-the-fly" mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing.

In one embodiment, composition has a viscosity of 0.5-200 cp, preferably 1-50 cp, more preferably 1-20 cp, even more preferably 1-10 cp at a temperature of 20-30° C. The composition may have a density of 58-100 lb/ft$^3$, preferably 62-90 lb/ft$^3$, more preferably 65-75 lb/ft$^3$. In one embodiment, one or more components of the composition may be encapsulated or modified for delayed release or delayed action. In one embodiment, the composition may be biodegradable.

In one embodiment, the silicate filter cake further comprises calcium carbonate, and the first composition comprises an excess of both $NaBrO_3$ and $NH_4Cl$ so that the excess $NH_4Cl$ and $NaBrO_3$ react to produce HCl, and the HCl reacts to dissolve the calcium carbonate. These excesses may be similar to those as described in the following second aspect.

According to a second aspect, the present disclosure relates to a one-step method for removing a filter cake from a subterranean formation. The method involves contacting the filter cake with a first composition comprising $NH_4F$, $NaBrO_3$, $NH_4Cl$, and $NaNO_2$, where the filter cake comprises calcium carbonate and silicate. The calcium carbonate may be in the form of hexagonal β-$CaCO_3$, also known as calcite, though the calcium carbonate may also include orthorhombic λ-$CaCO_3$ (aragonite) and hexagonal μ-$CaCO_3$, (vaterite). The calcium carbonate may be in the form of particles having diameters of 20-55 μm, preferably 25-50 μm, more preferably 30-45 μm. In some embodiments, the filter cake in this aspect of the disclosure is essentially free of barite, or comprises less than 20 wt %, preferably less than 10 wt %, or less than 5 wt % barite relative to a total weight of the filter cake. The filter cake may have previously comprised barite and was subjected to a filter cake removal method aimed at barite filter cakes, or the filter cake may have resulted from drilling fluids that use calcium carbonate as a weighting agent. This filter cake may be referred to as a calcite-silicate filter cake and may comprise 0.05-5 wt %, preferably 0.06-3 wt/o, more preferably 0.15-2 wt %, even more preferably 0.17-0.80 wt % silicate relative to a total weight of the calcite-silicate filter cake. The calcite-silicate filter cake may comprise 30-95 wt %, preferably 35-85 wt %, more preferably 40-80 wt % calcite with respect to a total weight of the filter cake prior to the contacting. The filter cake may have a thickness and comprise other compounds as previously described for the barite-silicate filter cake.

As described previously, the $NaNO_2$ and a first portion of $NH_4Cl$ react to produce $N_2$ gas, and the $NH_4F$ and a first portion of $NaBrO_3$ react to produce HF, where the HF reacts to dissolve the silicate. The reaction of $NaNO_2$ and the first portion of $NH_4Cl$ is exothermic, as previously described, and the heat produced helps to drive the endothermic reaction of the $NH_4F$ and the first portion of $NaBrO_3$. A second portion of $NH_4Cl$ and a second portion of $NaBrO_3$ represent the excess $NH_4Cl$ and $NaBrO_3$ that did not react in the endothermic or exothermic reactions just described. The second portion of $NH_4Cl$ and the second portion of $NaBrO_3$ react with one another to produce HCl, which HCl reacts to dissolve the calcium carbonate.

In one embodiment, a molar ratio of $NH_4Cl$ to $NaNO_2$ in the first composition is in a range of 1.05:1-2.00:1. In other words, the exothermic reaction has a 5%-100% stoichiometric excess of $NH_4Cl$. In other embodiments, the molar ratio is in a range of 1.10:1-1.80:1, preferably 1.15:1-1.75:1, more preferably 1.2:1-1.7:1. However, in some embodiments, the stoichiometric excess may be greater, such as $NH_4C$ to $NaNO_2$ having a molar ratio in a range of 2:1-100:1, 4:1-20:1, or 1.5:1-2:1.

In one embodiment, a molar ratio of $NaBrO_3$ to $NH_4F$ in the first composition is in a range of 2.10:1-3.00:1. In other words, the exothermic reaction has a 5%-100% stoichiometric excess of $NH_4CL$. In other embodiments, the molar ratio is in a range of 2.10:1-2.80:1, preferably 2.15:1-2.75:1, more preferably 2.2:1-2.7:1. However, in some embodiments, the stoichiometric excess may be greater, such as $NH_4Cl$ to $NaNO_2$ having a molar ratio in a range of 3:1-100:1, 4:1-20:1, or 2.5:1-3:1.

The first composition may comprise $NH_4F$, $NaBrO_3$, $NH_4Cl$, and $NaNO_2$ at any concentration described previously in the first aspect. In a further embodiment, the concentration of $NH_4F$, $NaBrO_3$, $NH_4Cl$, and $NaNO_2$ may independently be in a range of 0.1-5 M, 0.25-4 M, 0.5-3 M, 0.8-2 M, or about 1 M. The first composition may also comprise other additives as previously mentioned, including but not limited to carrier fluids, controlled release agents, converting agents, surfactants, polymer removal agents, stabilizers, and thickeners. The one step method may be used in any wellbore or similar structure and under similar conditions (temperature, contacting time, mixing, etc.) as previously mentioned. The method is considered "one step," because the single active step may only be that of contacting the filter cake with the first composition. In one embodiment, the method has no other active step. In another embodiment, the additional steps may be added to the method such as circulating the first composition or preheating the first composition.

The examples below are intended to further illustrate protocols for the barite-quartz and calcite-quartz filter cake removal method and are not intended to limit the scope of the claims.

Example 1

Methods

Drilled quartz fine particles precipitate in barite filter cake and are too difficult to remove using existing barite/calcite filter cake treatment fluid. The present invention provides a formulation and method to dissolve barite-quartz and calcite-quartz filter cakes. In the first stage of the method, the Quartz Removal Stage, the integrated quartz and polymer coat layer of the filter cake is dissolved.

Example 2

Quartz Removal Stage

In-situ hydrofluoric acid generation is accomplished by reacting an acid precursor, namely ammonium fluoride ($NH_4F$), with a strong oxidizer, e.g. sodium bromates ($NaBrO_3$) within an endothermic reaction. The heat required for this reaction to take place can be supplemented by another exothermic reaction or by down hole heat. The thermochemical reaction is accomplished by reacting ammonium chloride with sodium nitrite. The reactions are shown in Eqs. (1) & (2):

$$2NH_4F + NaBrO_3 + \Delta H \text{ (heat)} \rightarrow 2HF + NaBr + 3H_2O + N_2 \quad (1)$$

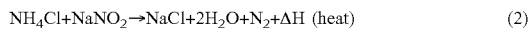

$$NH_4Cl + NaNO_2 \rightarrow NaCl + 2H_2O + N_2 + \Delta H \text{ (heat)} \quad (2)$$

By adjusting the stoichiometry of the thermochemical reaction (2), the generation of hydrofluoric acid can be controlled. Additionally, due to the exothermic reactions the near wellbore area temperature will increase. This increased temperature will improve the degradation and removal of the filter cake. Additionally the produced nitrogen gas will increase the pressure around the reaction area. This increased pressure and evolution of nitrogen gas will also have the beneficial effect of creating turbulence and a flow towards the top of the well and preventing the precipitation of reaction byproducts.

The disclosed formulation is able to dissolve 1200 ppm of Si (equivalent to 0.12 wt % relative to a total weight of the filter cake) at 250° F. and also has the capability to break any polymer in the filter cake due to the high pressure and high temperature generated by the thermochemical reaction. These solutions may be easily adapted to work in the field because the reactions will take place in-situ, thus eliminating corrosion risk.

The required concentrations of the ammonium fluoride ($NH_4F$) and a strong oxidizer, e.g. sodium bromate ($NaBrO_3$), for the first stage is shown in FIGS. 1 and 2.

Example 3

Calcite Removal Stage

The second stage of the invention includes the barite or calcite removal stage.

For a calcite filter cake, a second stage is required to remove the filter cake by in-situ generated HCl. The reaction takes place following this equation:

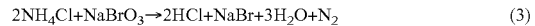

$$2NH_4Cl + NaBrO_3 \rightarrow 2HCl + NaBr + 3H_2O + N_2 \quad (3)$$

Because Eq. 3 shares reactants $NH_4C$ and $NaBrO_3$ with Eq. 1 and 2 of the first stage, the calcite-quartz filter cake removal can be conducted in a single step by adding an excess amount of $NH_4Cl$ and $NaBrO_3$ for the first stage. Then, part of these reactants will generate in-situ HF to dissolve Si in the filter cake as describe for the first stage, while the excess $NH_4Cl$ and $NaBrO_3$ will generate the required amount of HCl to dissolve the calcite in the remaining filter cake. As with the first stage, the current formulation has the capability to break polymers in the filter cake due to the high pressure and high temperature generated of the thermochemical reaction.

Example 4

Barite Removal Stage

The barite removal stage follows the first stage of dissolving the quartz. In the barite removal stage, 20 wt % concentration of either diethylene triamine pentaacetic acid (DTPA), or EDTA (ethylene diamine triacetic acid) with high pH, or a mixture of 10 wt % DTPA and 10 wt % EDTA plus a converting agent (potassium group) is used to dissolve the barite particles remaining in the filter cake.

Example 5

Testing Procedure

To check the performance of the new formulation for degrading barite-quartz filter cake, a solubility test was conducted at 300° F. and 500 psi. The solubility test was conducted as a function of quartz concentrations. A solid to liquid ratio of 4 g to 100 mL was used to run the solubility test. The dissolution capacity was evaluated where the total solids (4 g) was 100 wt % quartz and then using 20 wt % quartz to 80 wt % barite to study the capability of the invented formulation to dissolve the quartz particles in the present of barite. Finally, the ratio of quartz to barite was raised to 40 wt %:60 wt % to reach the maximum possible quartz percentage in the barite filter cake.

The experimental results showed that the new formulation containing ammonium fluoride ($NH_4F$) with a strong oxidizer, e.g. sodium bromate ($NaBrO_3$), within an endothermic reaction was able to generate hydrofluoric acid in-situ and so dissolve quartz ions. The presence of barite in the solution did not affect the efficiency of the current formulation to dissolve the quartz ions. Moreover, the results showed the capability of the present formulation to dissolve the entire quartz up to the worst case where the concentration reached up to 1200 ppm. FIGS. 1 and 2 show the required concentration to generate HF based on the Si concentration in the filter cake.

After that, a high pressure high temperature fluid loss test was conducted to form the filter cake using barite drilling fluid. The percentage of the sand in the filter cake was 40 wt % as a worst case. The removal process was performed under 300° F. and 500 psi through two stages. The first stage, degrading quartz and breaking polymer, takes place for 24 hrs. Then the filter cake was allowed to react with regular barite filter cake removal fluid consisting of 20% DTPA plus converting agent (potassium carbonate 6%).

Overall the method for barite-quartz and calcite-quartz filter cake removal has the advantages of:
1. In situ generation of HF for quartz dissolution.
2. This in situ generation reduces corrosion risk during the operation process.
3. High efficiency dissolution of the quartz in the filter cake.
4. The dissolved quartz stays suspended in solution.
5. The high pressure and high temperature generated by the thermochemical reaction is able to break any polymers present in the filter cake.
6. More than 90% of the barite-quartz filter cake is dissolved with the method.
7. The current formulation may be used to dissolve calcite-quartz filter cake in one stage.

The invention claimed is:

1. A method for removing a barite-silicate filter cake from a surface in fluid communication with a wellbore and/or subterranean formation, the method comprising:
contacting the barite-silicate filter cake with a first composition consisting of water, $NH_4F$, $NaBrO_3$, $NH_4Cl$, and $NaNO_2$,
wherein the $NH_4Cl$ and $NaNO_2$ react to produce $N_2$ gas,
wherein the $NH_4F$ and $NaBrO_3$ react to produce HF that dissolves the silicate of the barite-silicate filter cake and produces a barite-rich filter cake, and
contacting the barite-rich filter cake with a second composition comprising a chelating agent and a converting agent to dissolve the barite,
wherein the water is present in the first composition in an amount of 32-87 wt. % based on the total weight of the first composition, wherein a molar ratio of the $NH_4Cl$ to the $NaNO_2$ in the first composition is in a range of 1.10:1-1.80:1, and wherein a molar ratio of the $NaBrO_3$ to the $NH_4F$ in the first composition is in a range of 2.10:1-2.80:1.

2. The method of claim 1, wherein the barite-silicate filter cake comprises 0.05-5 wt % silicate relative to a total weight of the barite-silicate filter cake.

3. The method of claim 2, wherein the silicate comprises at least 80 wt % quartz relative to a total weight of the silicate.

4. The method of claim 1, wherein the first composition comprises 40-120 M $NH_4F$ per wt % Si present in the barite-silicate filter cake.

5. The method of claim 1, wherein the first composition comprises 10-80 M $NaBrO_3$ per wt % Si present in the barite-silicate filter cake.

6. The method of claim 1, wherein a total mass of barite-silicate filter cake dissolved is at least 80 wt % of a total mass of the barite-silicate filter cake.

7. The method of claim 1, wherein a maximum downhole pressure produced by the $NH_4Cl$ and $NaNO_2$ reacting to produce $N_2$ gas is 1.05-3 times a downhole pressure immediately prior to the contacting.

8. The method of claim 1, wherein the $NH_4Cl$ and $NaNO_2$ react exothermically and increase a downhole temperature by 15-60° F. compared to a downhole temperature immediately prior to the contacting.

9. The method of claim 1, wherein the barite-silicate filter cake is contacted with the first composition for a time in a range of 6-48 h.

10. The method of claim 1, wherein the dissolving of the silicate and the dissolving of the barite occurs at a temperature in a range of 225-450° F. and a pressure in a range of 400-600 psi.

11. The method of claim 1, wherein the chelating agent is a salt of at least one selected from the group consisting of DTPA, HEDTA, EDTA, GLDA, HEIDA, MGDA, EDDS, EGTA, NTA, CDTA, AMTP, HEDP, and citrate.

12. The method of claim 11, wherein the chelating agent is a salt of DTPA, a salt of EDTA, or a salt of both.

13. The method of claim 12, wherein the chelating agent consists of a salt of DTPA and a salt of EDTA, having a DTPA to EDTA mass ratio in a range of 1.0:1.1-1.1:1.0.

14. The method of claim 1, wherein the converting agent is at least one selected from the group consisting of ammonium carbonate, ammonium chloride, potassium carbonate, potassium chloride, potassium formate, potassium hydroxide, potassium nitrate, potassium cyanide, cesium carbonate, cesium chloride, cesium formate, lithium carbonate, lithium formate, calcium chloride, magnesium chloride, and sodium carbonate.

15. The method of claim 14, wherein the converting agent is at least one selected from the group consisting of potassium carbonate, potassium chloride, potassium formate, potassium hydroxide, potassium nitrate, and potassium cyanide.

16. The method of claim 1, wherein the second composition comprises a polymer removal agent.

17. The method of claim 1, wherein the second composition further comprises at least one surfactant.

18. The method of claim 1, wherein the silicate filter cake further comprises calcium carbonate, and
wherein the first composition comprises an excess of both $NaBrO_3$ and $NH_4Cl$ so that the excess $NH_4Cl$ and $NaBrO_3$ react to produce HCl, and the HCl reacts to dissolve the calcium carbonate.

19. A one-step method for removing a filter cake from a subterranean formation, the method comprising:
contacting the filter cake with a first composition comprising $NH_4F$, $NaBrO_3$, $NH_4Cl$, and $NaNO_2$,
wherein the filter cake comprises calcium carbonate and silicate,
wherein the $NaNO_2$ and a first portion of $NH_4Cl$ react to produce $N_2$ gas,
wherein the $NH_4F$ and a first portion of $NaBrO_3$ react to produce HF that dissolves the silicate, and
wherein a second portion of $NH_4Cl$ and a second portion of $NaBrO_3$ react to produce HCl that dissolves the calcium carbonate.

20. The method of claim 1, wherein a molar ratio of $NH_4Cl$ to $NaNO_2$ is in range of 1.05:1-2.00:1.

\* \* \* \* \*